(12) United States Patent
Ishikawa

(10) Patent No.: US 11,143,279 B2
(45) Date of Patent: Oct. 12, 2021

(54) TRANSMISSION, AND MANUFACTURING METHOD FOR SAME

(71) Applicants: JATCO Ltd, Fuji (JP); NISSAN MOTOR CO., LTD., Yokohama (JP)

(72) Inventor: Yasuhiro Ishikawa, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/977,871

(22) PCT Filed: Jan. 28, 2019

(86) PCT No.: PCT/JP2019/002623
§ 371 (c)(1),
(2) Date: Sep. 3, 2020

(87) PCT Pub. No.: WO2019/171812
PCT Pub. Date: Sep. 12, 2019

(65) Prior Publication Data
US 2021/0003200 A1 Jan. 7, 2021

(30) Foreign Application Priority Data
Mar. 6, 2018 (JP) .............................. JP2018-039810

(51) Int. Cl.
*F16H 41/24* (2006.01)
*F16H 45/02* (2006.01)

(52) U.S. Cl.
CPC ............. *F16H 41/24* (2013.01); *F16H 45/02* (2013.01); *F16H 2041/246* (2013.01); *F16H 2045/0273* (2013.01)

(58) Field of Classification Search
CPC ... F16H 41/24; F16H 45/02; F16H 2045/0273
See application file for complete search history.

(56) References Cited

U.S. PATENT DOCUMENTS

| 2007/0007095 A1* | 1/2007 | Tsukamoto | F16D 25/0638 |
| | | | 192/3.29 |
| 2011/0192691 A1* | 8/2011 | Murata | F16H 45/02 |
| | | | 192/3.3 |
| 2011/0214958 A1* | 9/2011 | Sturgin | F16D 33/00 |
| | | | 192/3.25 |
| 2015/0152949 A1* | 6/2015 | Avins | F16H 41/24 |
| | | | 60/330 |

FOREIGN PATENT DOCUMENTS

WO    WO-2011/066879 A1    6/2011

* cited by examiner

*Primary Examiner* — Huan Le
(74) *Attorney, Agent, or Firm* — Foley & Lardner LLP

(57) ABSTRACT

A transmission includes: a torque converter; a transmission input shaft; a seal member sandwiched between the hollow shaft and the transmission input shaft; and a bush, the transmission input shaft including a large diameter portion abutted on the seal member, and a small diameter portion which is positioned on the tip end side of the large diameter portion, and which has a diameter smaller than a diameter of the large diameter portion, the seal member having a diameter larger than a diameter of the bush, and the small diameter portion having an axial length set to be longer than a length from an insertion inlet of the transmission input shaft of the bush to the seal member.

5 Claims, 7 Drawing Sheets

TRANSMISSION, AND MANUFACTURING METHOD FOR SAME

TECHNICAL FIELD

This invention relates to a transmission and a manufacturing method thereof.

BACKGROUND ART

A patent document 1 discloses an automatic transmission including a seal member inside a hollow shaft of a torque converter.

FIG. 7 is a view for explaining an automatic transmission 300 according to a conventional example. FIG. 7 is a view for explaining a state where a torque converter 2 and an input shaft 100 are assembled. FIG. 7(a) is a sectional view showing by enlarging a fitting portion between the torque converter 2 and the input shaft 100. FIG. 7(b) is a view for explaining an assembling operation (mounting operation) of the torque converter 2 to the input shaft 100.

As shown in FIG. 7(a), the torque converter 2 includes a pump impeller 21, a turbine runner 22, and a stator 23.

The pump impeller 21 and the turbine runner 22 are disposed on a common rotation axis X to be rotated relative to each other. The stator 23 supported by a stator shaft 11 is positioned between the pump impeller 21 and the turbine runner 22.

The turbine runner 22 is fit over and splined to the input shaft 100 extending from a shift mechanism section (not shown) of the automatic transmission 300 through a turbine hub 60.

In the torque converter 2, a rotation driving force of an engine (not shown) is inputted to the pump impeller 21, so that the pump impeller 21 is rotated around the rotation axis X.

When the pump impeller 21 is rotated, the rotation of the pump impeller 21 is transmitted through a hydraulic fluid within the torque converter 2 to the turbine runner 22, so that the turbine runner 22 is rotated around the rotation axis X.

The turbine hub 60 supporting the turbine runner 22 is fit on a spline fitting portion 104 provided to the input shaft 100 so as not to be relatively rotated. When the rotation driving force is transmitted to the turbine runner 22, the turbine runner 22 and the input shaft 100 are rotated as a unit around the rotation axis X by the transmitted rotation driving force.

In the input shaft 100, a small diameter portion 101 inserted on the inner circumference side of the torque converter 2 is rotatably supported by the support member 16 connected to the converter cover 24.

The support member 16 includes a cylindrical base portion 161; and a flange portion 162 extending from one end of the base portion 161 in the radial direction.

The small diameter portion 101 of the input shaft 100 is inserted into the cylindrical base portion 161. The small diameter portion 101 of the input shaft 100 is provided through a bush 125 provided to an inner circumference 161a of the base portion 161, so as to rotate at the base portion 161.

The bush 125 is provided for improving the axis aligning accuracy of the input shaft 100 (the accuracy to align the center axes at the mounting).

A seal ring S1 is provided to the inner circumference of the base portion 161 at a position apart from the bush 125 in the direction of the rotation axis X. The seal ring S1 protrudes from the inner circumference of the base portion 161 in the radially inside direction. The seal ring S1 is pressed into contact with (press-contacted on) the outer circumference of the small diameter portion 101.

As shown in FIG. 7(b), at the manufacturing of the automatic transmission 300, the previously assembled torque converter 2 is inserted and mounted on the input shaft 100 from the direction of the rotation axis X, so that the torque converter 2 and the input shaft 100 are assembled.

In this case, in the automatic transmission 300 shown in FIG. 7, the small diameter portion 101 of the input shaft 100 is inserted into the inside of the cylindrical base portion 161 of the support member 16, before the fitting between the turbine hub 60 and the spline portion 104 of the input shaft 100.

The axis aligning of the input shaft 100 and the support member 16 is not finished before the fitting between the turbine hub 60 and the spline portion 104.

Accordingly, the small diameter portion 101 of the input shaft 100 may be inserted into the inside of the cylindrical base portion 161 in a state where the small diameter portion 101 of the input shaft 100 is inclined with respect to the rotation axis X.

In this case, the small diameter portion 101 of the input shaft 100 may be caught in the seal ring S1 protruding from the inner circumference of the base portion 161, so that the seal ring S1 may be damaged.

PRIOR ART DOCUMENT

Patent Document

Patent Document 1: WO 2011/066879

SUMMARY OF THE INVENTION

Accordingly, it is required that the seal ring is not damaged at the assembly operation of the torque converter to the input shaft.

The present invention provides a transmission and a manufacturing method thereof which are devised so as not to damage the seal ring.

In the present invention, a transmission includes:
  a torque converter including a hollow shaft;
  a transmission input shaft provided radially inside the hollow shaft;
  a seal member sandwiched between the hollow shaft and the transmission input shaft; and
  a bush sandwiched between the hollow shaft and the transmission input shaft, and provided at a tip end side of the transmission input shaft with respect to the seal member,
  the transmission input shaft including a large diameter portion abutted on the seal member, and a small diameter portion which is positioned on the tip end side of the large diameter portion, and which has a diameter smaller than a diameter of the large diameter portion,
  the seal member having a diameter larger than a diameter of the bush, and
  the small diameter portion having an axial length set to be longer than a length from an insertion inlet of the transmission input shaft of the bush to the seal member.

Moreover, in the present invention, a manufacturing method for a transmission including
  a torque converter including a hollow shaft;
  a transmission input shaft which is provided radially inside the hollow shaft, and which includes a small diameter portion, and a large diameter portion having a diameter greater than a diameter of the small diameter portion;

a seal member sandwiched between the hollow shaft and the transmission input shaft; and a bush which is sandwiched between the hollow shaft and the transmission input shaft, which is provided at a tip end side of the transmission input shaft with respect to the seal member, and which has a diameter smaller than a diameter of the seal member, the manufacturing method comprising:

when the torque converter is mounted to the transmission input shaft, pushing the torque converter to align an axis of the small diameter portion in a state where the seal member and the large diameter portion are not abutted, and further pushing the torque converter to contact the large diameter portion and the seal member.

By the present invention, it is possible not to damage the seal ring at the assembly operation of the torque converter to the input shaft.

DESCRIPTION OF EMBODIMENTS

Hereinafter, an embodiment according to the present invention is explained.

Figure 1:
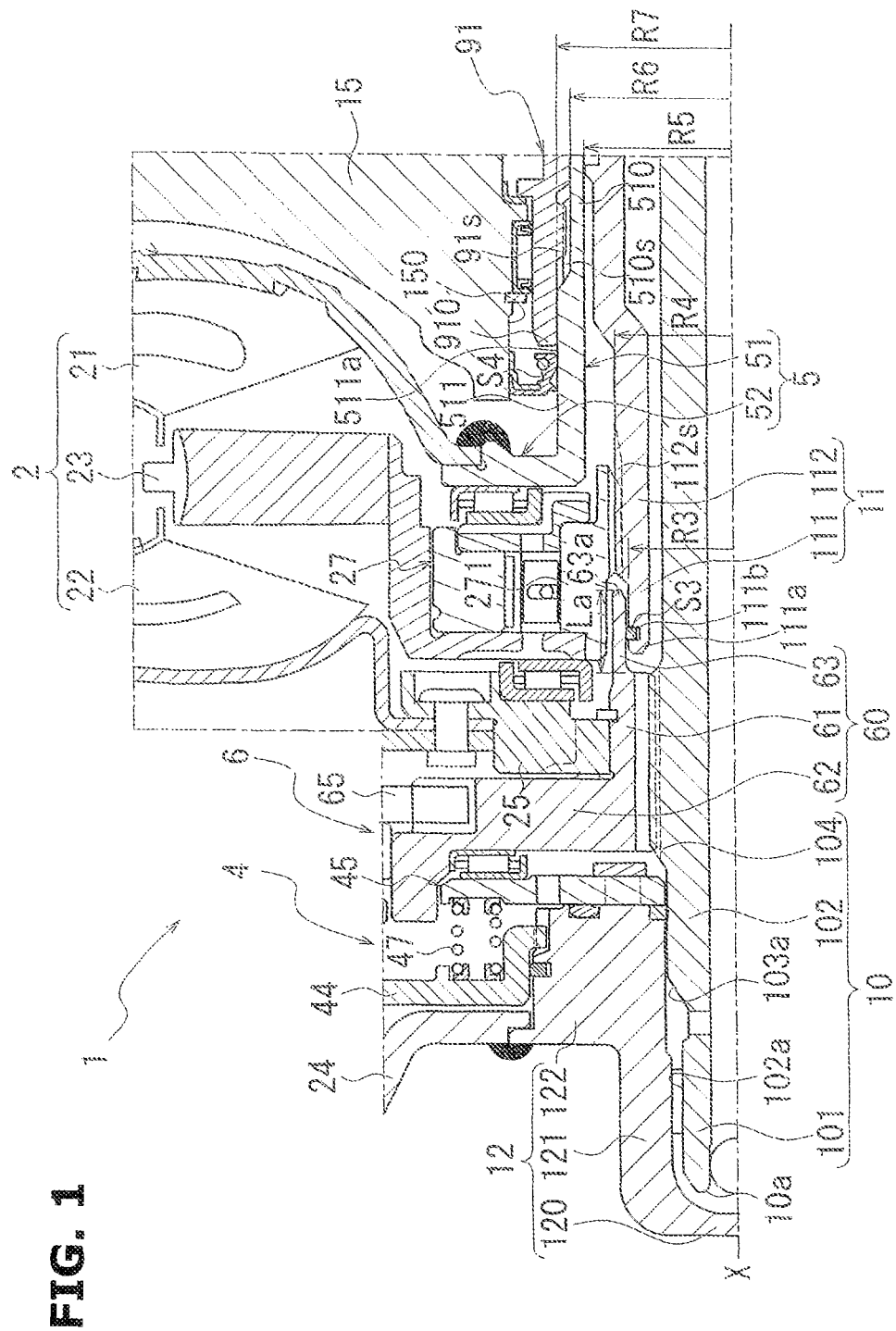
FIG. 1 is a view for explaining a main part of an automatic transmission according to an embodiment.

FIG. 1 is a view for explaining an automatic transmission 1 (transmission) according to the embodiment. FIG. 1 is a view for explaining a state where a torque converter 2 and an input shaft 10 are assembled.

Figure 2:
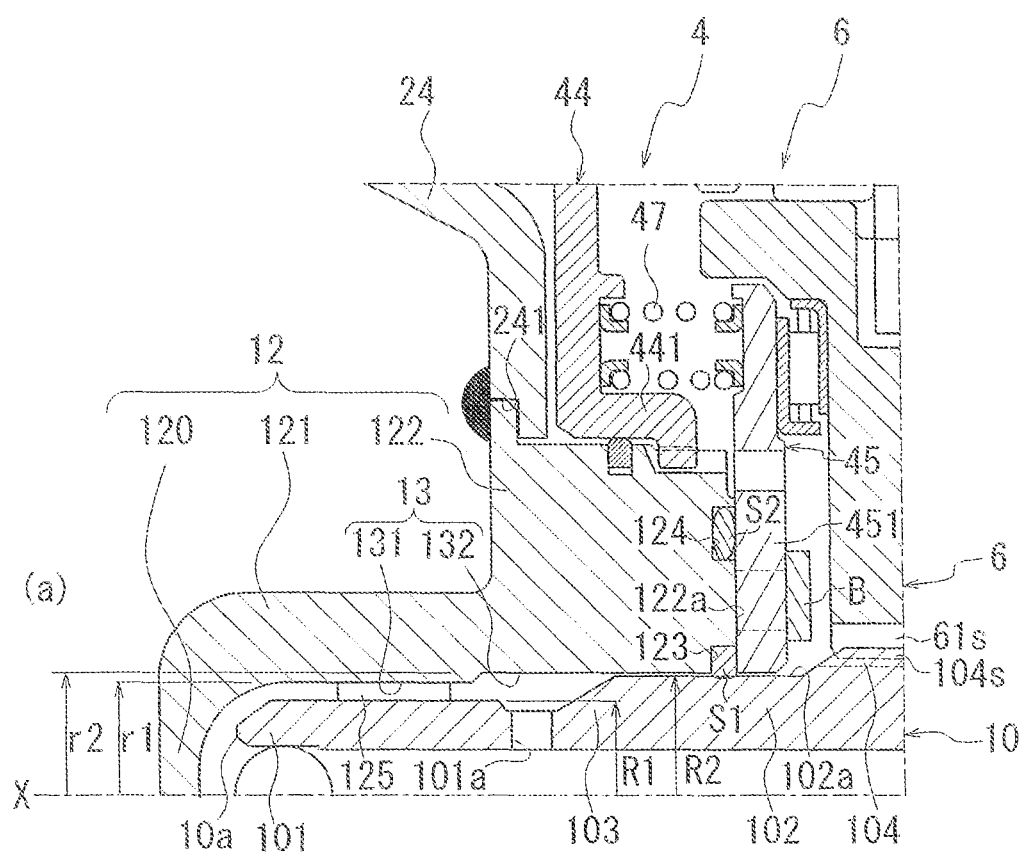
FIG. 2 are enlarged views showing by enlarging a portion around a support member shown in FIG. 1.
Figure 2:
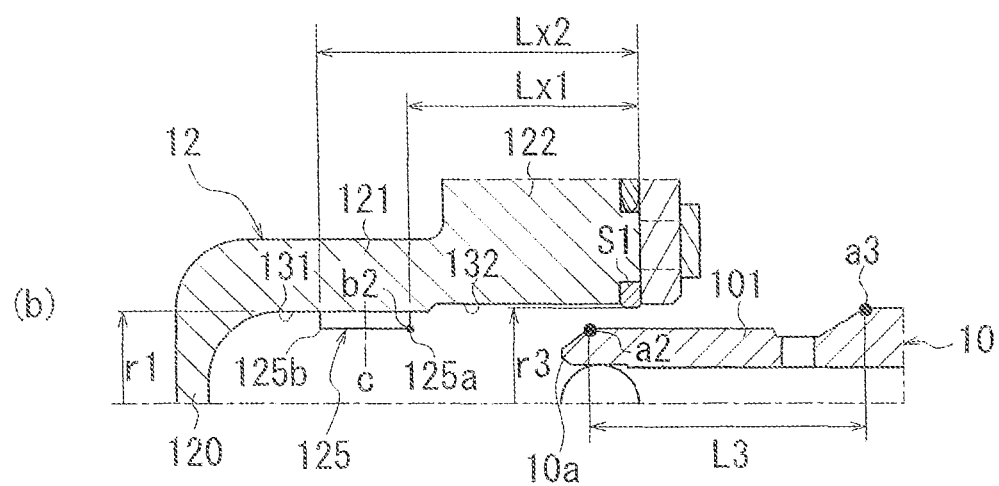

FIG. 2 is an enlarged view showing by enlarging a portion around a support member 12 in FIG. 1. FIG. 2(a) is an enlarged view obtained by enlarging the portion around the support member 12. FIG. 2(b) is a view showing by separating the support member 12 and the input shaft 10 in a direction of a rotation axis X.

In the automatic transmission 1 of the vehicle, a rotation driving force of an engine (not shown) is transmitted through a converter 2 to the input shaft 10 extending from a shift mechanism section (not shown).

As shown in FIG. 1, the input shaft 10 includes a tip end 10a side in a longitudinal direction. The tip end 10a side is rotatably supported by the support member 12 on the torque converter 2 side.

On the tip end 10a side of the input shaft 10, a small diameter portion 101, and a region of a large diameter portion 102 near the small diameter portion 101 are rotatably supported by the support member 12.

As shown in FIG. 2, the large diameter portion 102 has an outside diameter R2 greater than an outside diameter R1 of the small diameter portion 101. A diameter increasing portion 103 is formed between the small diameter portion 101 and the large diameter portion 102. The diameter increasing portion 103 has outside diameters increased from the small diameter portion 101 toward the large diameter portion 102.

An oil hole 101a is opened between the small diameter portion 101 and the diameter increasing portion 103. The oil hole 101a is configured to supply the hydraulic fluid to a lockup mechanism 4.

The large diameter portion 102 includes a spline portion 104 formed on an outer circumference at a position apart from a boundary (an engagement start point a3) between the diameter increasing portion 103 and the large diameter portion 102. A spline 61s of the turbine hub 60 of the torque converter 2 side is fit over and splined to a spline 104s of this spline portion 104.

The large diameter portion 102 includes an outer circumference 102a located in a region on the small diameter portion 101 side (the left side in the drawing) of the spline portion 104. The outer circumference 102a of the large diameter portion 102 is supported by the support member 12 of the torque converter 2 side.

The support member 12 includes a cylindrical base portion 121; a bottom wall portion 120 sealing a first end of the base portion 121; and a large diameter support portion 122 extending in a radially outside direction from an outer circumference of a second end side (the shift mechanism section side) of the base portion 121. The support member 12 is integrally formed by the base portion 121, the bottom wall portion 120, and the large diameter support portion 122. The support member 12 is a hollow shaft.

The support member 12 is inserted into a fitting hole 241 of the converter cover 24 from an engine (not shown) side (a left side in the drawing).

In this state, the support member 12 is positioned on a rotation axis X. The converter cover 24 is welded and fixed to the outer circumference of the bottom wall portion 120 side (the left side in the drawing) of the large support portion 122 of the support member 12.

A piston 44 of the lockup mechanism 4 is positioned radially outside the large diameter support portion 122. A cylindrical portion 441 on the inner circumference side of the piston 44 is fit over and splined to the outer circumference of the large diameter support portion 122. In this state, the piston 44 is configured to be moved in the direction of the rotation axis X in a state where the relative rotation between the piston 44 and the support member 12 is restricted.

The large diameter support portion 122 has an inside diameter r2 larger than an inside diameter r1 of the base portion 121. The support member 12 includes a support hole 13 of the input shaft 10 which is formed inside the support member 12. This support hole 13 includes a small diameter hole portion 131 on the bottom wall portion 120 side; and a large diameter hole portion 132 which is adjacent to this small diameter hole portion 131. The support hole 13 is constituted by the small diameter hole portion 131 and the large diameter hole portion 132 which are connected in series with each other.

The support member 12 is provided so that the large diameter hole portion 132 directs the shift mechanism section side (the right side in the drawing).

An end surface 122a of the large diameter support portion 122 on the shift mechanism section side (the right side in the drawing) is a flat surface perpendicular to the rotation axis X. This end surface 122a includes a recessed groove 123 and a ring groove 124.

The recessed groove 123 is provided along an outer circumference edge of the large diameter hole portion 132 of the support hole 13. The ring groove 124 is provided to surround the support hole 13 with a predetermined clearance radially outside the recessed groove 123.

Seal rings S1 and S2 are mounted, respectively, in the recessed portion 123 and the ring groove 124 from the direction of the rotation axis X.

A circular plate portion 451 radially inside a spring retainer 45 is mounted to the end surface 122a of the large diameter support portion 122 from the direction of the rotation direction X.

Accordingly, in a case where the spring retainer 45 is fixed to the large diameter support portion 122 by a bolt B, the seal rings S1 and S2 are pressed into contact with (press-contacted on) the spring retainer 45, so as to seal a clearance between the end surface 122a of the large diameter support portion 122, and the spring retainer 45.

In this state, the seal ring S1 protrudes from the inner circumference of the large diameter hole portion 132 of the support hole 13. The seal ring S1 is pressed into contact with the outer circumference of the large diameter portion 102 of the input shaft 10.

In the support hole 13, a ring-shaped bush 125 is provided to an inner circumference of the small diameter hole portion 131 adjacent to the large diameter hole portion 132. The bush 125 has an inside diameter corresponding to the outside diameter R1 of the small diameter portion 101 of the input shaft 10 side, and an outside diameter corresponding to the inside diameter r1 of the small diameter hole portion 131 of the support hole 13.

The bush 125 has the outside diameter r1 smaller than an inside diameter r3 of the seal ring S1 before the seal ring S1 is pressed into contact with the outer circumference of the small diameter portion 101 (r3>r1).

In the small diameter hole portion 131, the cylindrical bush 125 is provided to direct along the rotation axis X.

In a case where the torque converter 2 is assembled to the input shaft 10, the small diameter portion 101 of the input shaft 10 penetrates through the inside of this bush 125 in the direction of the rotation axis X.

The bush 125 includes an end portion which is on the shift mechanism section side (on the right side in FIG. 2(b)), and which is an inlet (an insertion inlet 125a) of the input shaft 10 when the torque converter 2 is assembled to the input shaft 10; and an end portion which is on the opposite side, and which is an outlet (an insertion outlet 125b) of the input shaft.

In the support member 12, the small diameter portion 101 on the input shaft 10 side is rotatably supported through the bush 125 in the region of the small diameter hole portion 131. The large diameter portion 102 on the input shaft 10 side is rotatably supported in the region of the large diameter hole portion 132.

The spline 104s is provided on the outer circumference of the large diameter portion 102 of the input shaft 10 so as to avoid the interference with the spring retainer 45. The spline 61s of the turbine hub 60 is fit over the spline 104s.

As shown in FIG. 1, in the turbine hub 60, the circular plate portion 62 extending in the radial direction is provided at an end portion of the cylindrical portion 61 on the spring retainer 45 side (the left side in the drawing). A driven plate 65 of a damper device 6 is connected to an outer circumference of this circular plate portion 62.

A connection member 25 connected to the inner circumference side of the turbine runner 22 is connected to the outer circumference of the cylindrical portion 61, at a position adjacent to the circular plate portion 62 so as not to rotate relative to the cylindrical portion 61.

In the cylindrical portion 61, an annular wall portion 63 is provided at an end portion opposite to the support member 12.

The annular wall portion 63 extends in a direction (the rightward direction in the drawing) apart from the support member 12 along the rotation axis X.

A tip end 63a side of the annular wall portion 63 has a length La extending in the direction of the rotation axis X to the outer circumference side of the tip end portion 111 of the stator shaft 11.

At the tip end portion 111 of the stator shaft 11, the seal ring S3 is mounted in the recessed groove 111b opened on the outer circumference.

The seal ring S3 is pressed into contact with the inner circumference surface of the annular wall portion 63. The seal ring S3 seals the clearance between the outer circumference of the stator shaft 11, and the inner circumference of the annular wall portion 63.

The stator shaft 11 is a cylindrical member inserted and mounted on the input shaft 10. A base end of this stator shaft 11 is fixed to a fixed side member 15 of a transmission case (not shown).

The stator shaft 11 includes a connection portion 112 which is adjacent to the tip end portion 111, and which is connected with an inner race 271.

The connection portion 112 has an outside diameter R4 greater than an outside diameter R3 of the tip end portion 111. The connection portion 112 includes a spline 112s formed on the outer circumference of the connection portion 112 in a predetermined region on the tip end portion 111 side.

The inner race 271 supporting one-way clutch 27 is fit over and splined to the spline 112s of the connection portion 112.

A sleeve 5 is provided radially outside the stator shaft 11. The sleeve 5 is configured to transmit the rotation of the pump impeller 21 of the torque converter 2, to the oil pump (not shown) side.

The sleeve 5 includes a cylindrical portion 51 surrounding the outer circumference of the stator shaft 11; and a circular plate portion 52 extending in the radially outward direction from the end portion of the cylindrical portion 51 on the one-way clutch 52. In the sleeve 5, the pump impeller 21 is fixed on the outer circumference of the circular plate portion 52.

The cylindrical portion 51 includes a fitting portion 510 including an outer circumference on which a spline 510s is formed; and a connection portion 511 connecting the fitting portion 510 and the circular plate portion 52. The fitting portion 510 and the connection portion 511 has the same inside diameter R5. The fitting portion 510 has an outside diameter R6 smaller than an outside diameter R7 of the connection portion 511. The spline 510s of the fitting portion 510 is positioned radially inside the outer circumference 511a of the connection portion 511.

A hollow cylindrical rotation transmitting member 91 is positioned on an outer circumference of the connection portion 511.

The rotation transmitting member 91 is configured to transmit the rotation transmitted from the sleeve 5, to a drive sprocket (not shown). The rotation transmitting member 91 is rotatably supported by the support hole 150 of the fix side member of the transmission case side.

A spline 91s is provided on an inner circumference of the rotation transmitting member 91. The spline 91s is provided on the inner circumference at a positon apart from a tip end 910 of the circular plate side (the left side in the drawing).

The spline 510s of the sleeve 5 side is fit in and splined to the spline 91s of the rotation transmitting member 91 from the direction of the rotation axis X. The rotation transmitting member 91 and the sleeve 5 are rotatably connected to each other to transmit the rotation.

In this state, a lip seal S4 seals a clearance between the outer circumference of the connection portion 511 of the sleeve 5, and the inner circumference of the support hole 150 of the fixed side member 15.

Hereinafter, assembling process of the torque converter 2 and the input shaft 10 is explained with reference to FIG. 3 to FIG. 6.

FIG. 3 to FIG. 6 are views for explaining the assembling operation of the input shaft 10 and the torque converter 2.

FIG. 3(a) is a view for explaining a state before the torque converter 2 is assembled to the input shaft 10 of the shift mechanism section side. FIG. 3(b) is a view showing a state where an initial engagement start point b1 of the torque converter 2 side is engaged with an initial engagement start point a1 of the input shaft 10 side. FIG. 3(c) is a view which is obtained by enlarging the region A of FIG. 3(b), and which shows by enlarging a portion around the initial engagement start point b1 of the torque converter 2 side, and the initial engagement point a1 of the input shaft 10 side.

Figure 4:
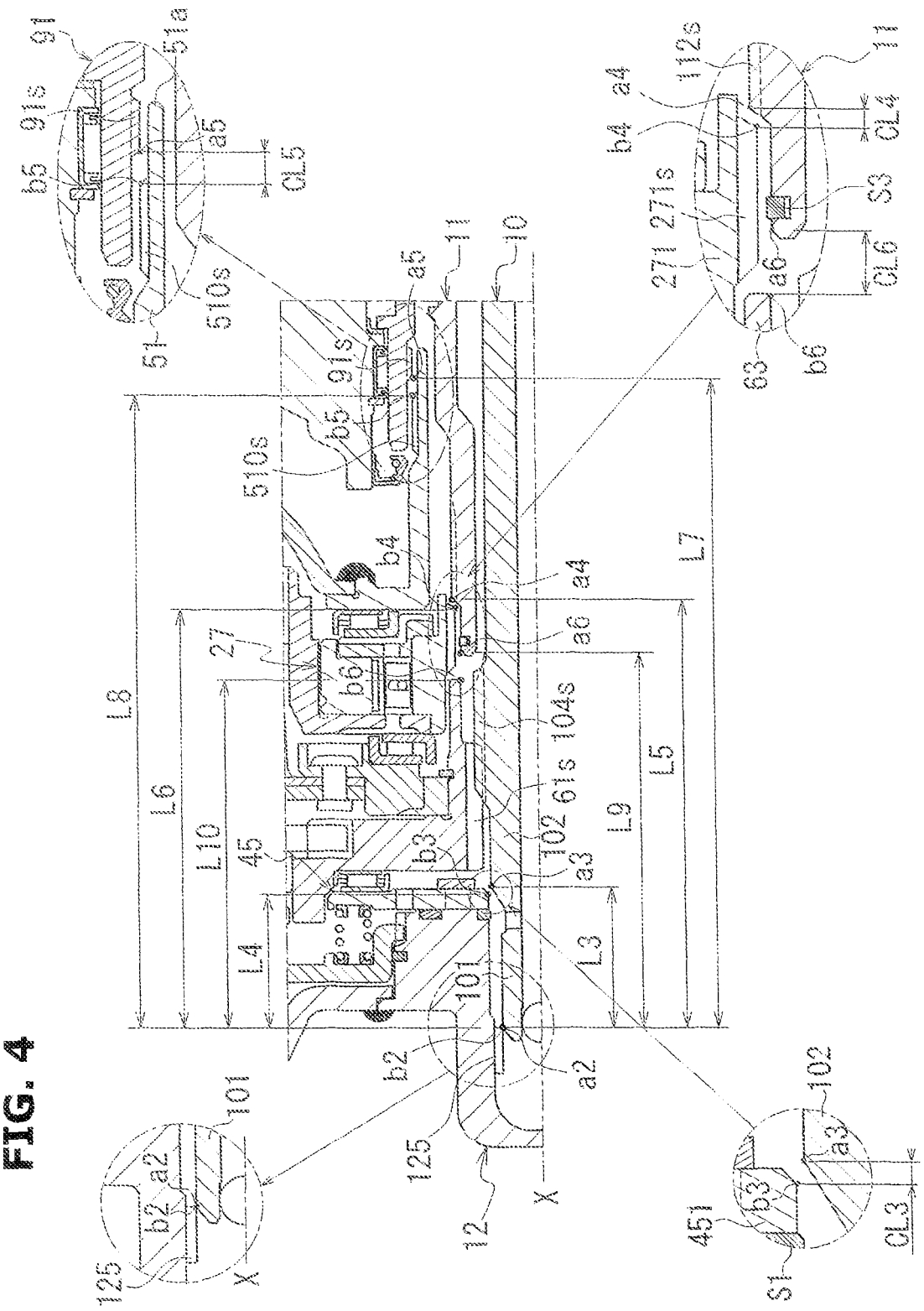
FIG. 4 is a view for explaining the assembling process of the input shaft and the torque converter shown in FIG. 1.
Figure 5:
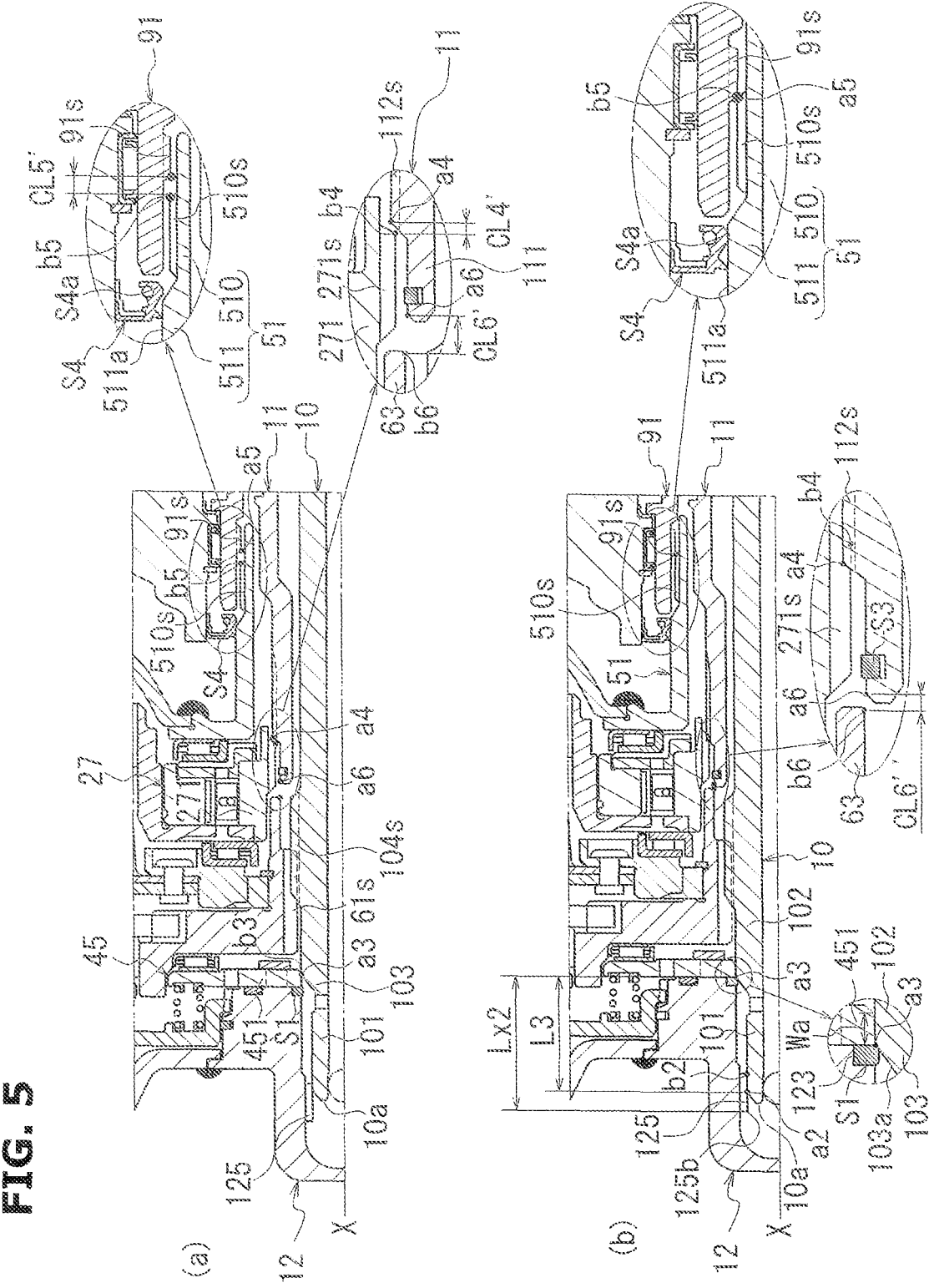
FIG. 5 are views for explaining the assembling process of the input shaft and the torque converter shown in FIG. 1.
Figure 6:
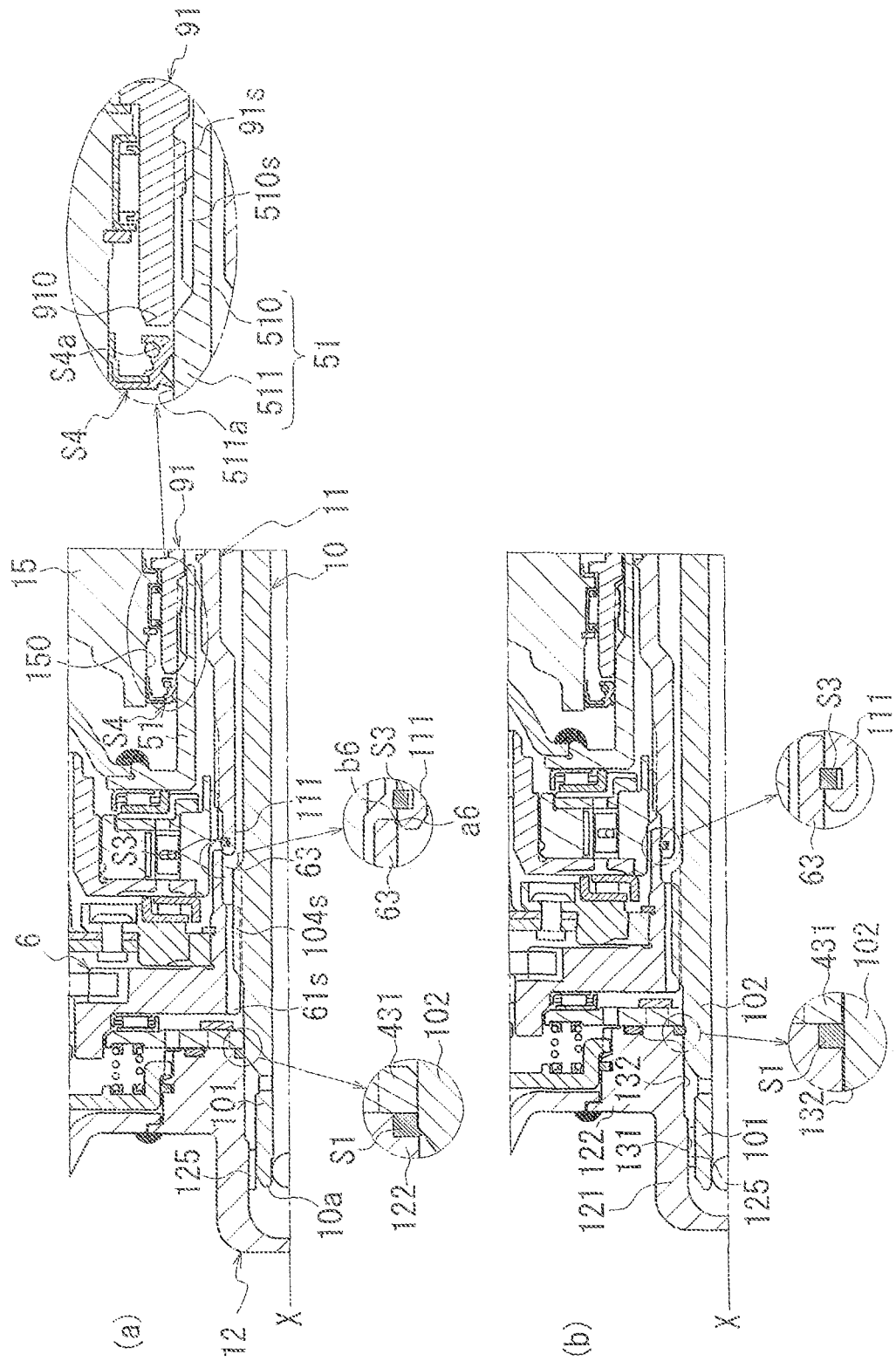
FIG. 6 are views for explaining the assembling process of the input shaft and the torque converter shown in FIG. 1.
Figure 7:
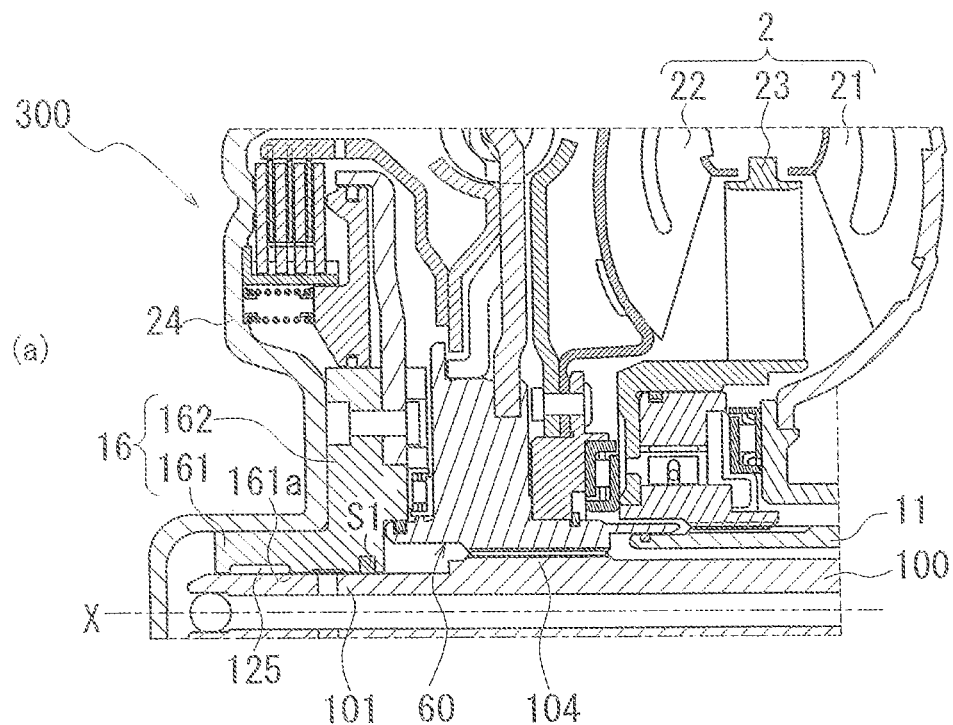
FIG. 7 are views for explaining a main part of an automatic transmission according to a conventional example.
Figure 7:
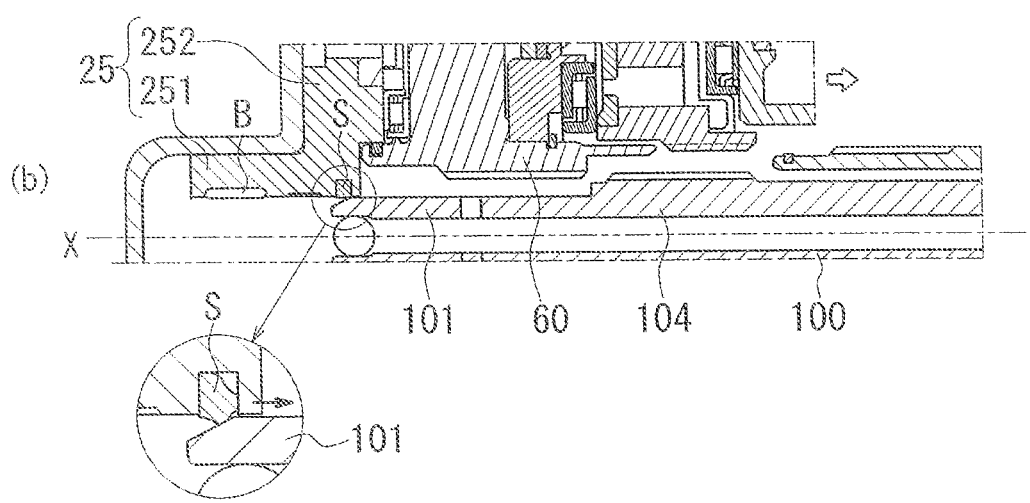

FIG. 4 is a view showing a state where the engagement start point b2 of the bush 125 of the support member 12 is engaged with the engagement start point a2 of the small diameter portion of the input shaft 10.

This drawing shows by enlarging states of the engagement start points b3, b4, b5 and b6, the engagement start points a3, a4, a5, and a6, and the clearances CL3, CL4, CL5, and CL6 at a timing at which the engagement start point b2 and the engagement start point a2 are engaged.

In a case where the torque converter 2 is assembled to the input shaft 10 of the shift mechanism section side, the torque converter 2 is previously sub-assembled.

The sub-assembled torque converter 2 is assembled to the input shaft 10 from the direction of the rotation axis X of the input shaft 10.

The cylindrical portion 51 of the sleeve 5 protrudes on a side (the right side in FIG. 3(a)) of the torque converter 2 confronting the shift mechanism section.

The input shaft 10 and the stator shaft 11 protrude toward the torque converter 2 on the side of the shift mechanism confronting the torque converter 2. In the fixed side member 15 of the transmission case, the rotation transmitting member 91 connected to the sleeve 5 is rotatably supported by the inner circumference of the support hole 150.

In the input shaft 10, the end portions of the small diameter portion 101, the large diameter portion 102, and the spline 194s on the torque converter side (the left side in the drawing) are the engagement start points a2, a3, and a1 with respect to the torque converter 2 side.

In the stator shaft 11, the end portions of the tip end portion 111, and the spline 112s on the torque converter 2 side (the left side in the drawing) are the engagement start points a6 and a4 with respect to the torque converter 2 side.

In the rotation transmitting member 91, the end portion of the spline 91s on the torque converter 2 side (the left side in the drawing) is the engagement start point a5 with respect to the torque converter 2 side.

In the torque converter 2, the end portion of the bush 125 on the input shaft 10 side (the right side in the drawing), and the end portion of the circular plate portion 451 of the spring retainer 45 on the input shaft 45 side (the right side in the drawing) are the engagement start points b2 and b3 with respect to the engagement start points a2 and a3 of the input shaft 10.

The end portion of the spline 61s of the turbine hub 60 on the input shaft 10 side (the right side in the drawing) is the engagement start point b1 with respect to the engagement start point a1 of the input shaft 10.

The end portion of the annular wall portion 63 of the turbine hub 60 on the input shaft 10 side (the right side in the drawing) is the engagement start point b6 with respect to the engagement start point a6 of the stator shaft 11.

The end portion of the spline 27s of the inner race 271 on the input shaft 10 side (the right side in the drawing) is the engagement start point b4 with respect to the engagement start point a4 of the stator shaft 11.

Moreover, the end portion of the spline 510s of the sleeve 5 on the input shaft 10 side (the right side in the drawing) is the engagement start point b5 with respect to the start point a5 of the rotation transmitting member 91.

When the torque converter 2 is assembled to the input shaft 10 of the shift mechanism section side, firstly, a central line of the torque converter 2 (the support member 12) is disposed to be coaxial with the rotation axis X of the input shaft 10 (cf. FIG. 3(a)).

In this state, the turbine hub 60, the inner race 271, and the sleeve 5 are disposed to be coaxial with the rotation axis X.

In the state where the torque converter 2 and the input shaft 10 are disposed to be coaxial with each other, the torque converter 2 is moved in the assembling direction (the rightward direction in the drawing) to the input shaft 10 of the shift mechanism section. With this, firstly, the tip end 51a of the sleeve 5 is inserted between the stator shaft 11 and the rotation transmitting member 91 (cf. FIG. 3(b)).

Next, the engagement start point b1 of the spline 61s of the turbine hub 60 is engaged with the engagement start point a1 of the spline 104s of the input shaft 10 (cf. FIGS. 3(b) and 3(c)).

In this case, the input shaft 10 is set so that the small diameter portion 101 side satisfies the following conditions (A) to (C).

Figure 3:
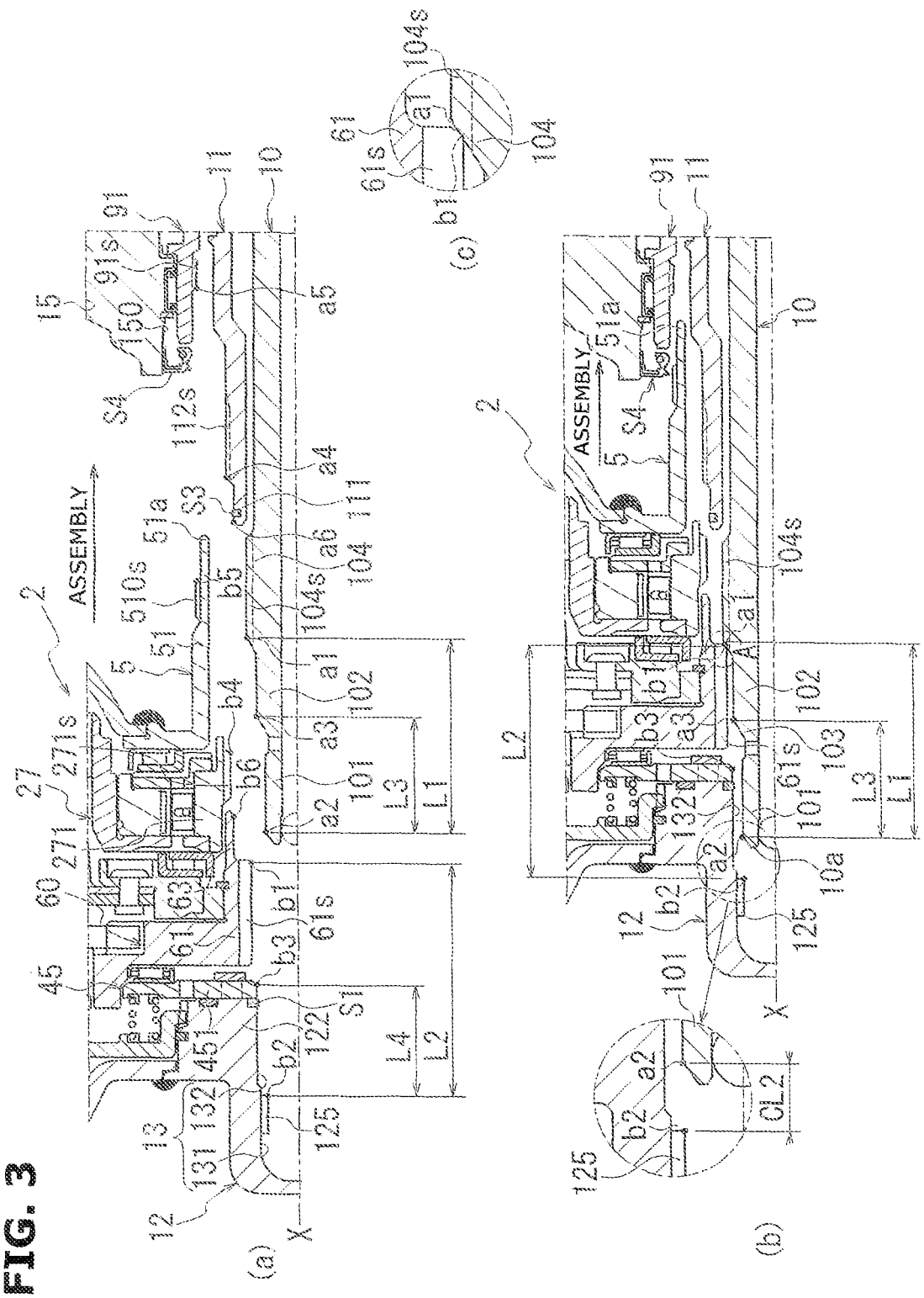
FIG. 3 are views for explaining an assembling process of an input shaft and a torque converter shown in FIG. 1.

(A) A length L1 from the engagement start point a2 of the tip end 10a of the input shaft 10 to the engagement start point a1 of the spline 104 is shorter than a length L2 from the engagement start point b2 of the bush 125 to the engagement start point b1 of the spline 61s of the turbine hub 60 in the torque converter 2 (L1<L2: cf. FIG. 3).

(B) A length L3 from the engagement start point a2 to the engagement start point a3 of the boundary between the diameter increasing portion 103 and the large diameter portion 102 is set so that the small diameter portion 101 of the input shaft 10 is positioned radially inside the large diameter hole portion 132 of the support member 12 when the engagement start point a1 of the spline 104s and the engagement start point b1 of the spline 61s are engaged with each other.

(C) The length L3 from the engagement start point a2 to the engagement start point a3 (the substantial axial length of the small diameter portion 101 in the direction of the rotation axis X) is set to be longer than a length Lx1 (cf. FIG. 2) from the engagement start point b2 (the insertion inlet 125a of the transmission input shaft) of the bush 125 to the seal ring S1.

Accordingly, the small diameter portion 101 of the input shaft 10 is loosely fit in the support hole 13 (the large diameter hole portion 132) of the support member 12 when the engagement start point a1 of the input shaft 10 side and the engagement start point b1 of the torque converter 2 side are engaged with each other.

Moreover, the engagement start point b2 of the support member 12 side confronts the engagement start point a2 of the input shaft 10 side with a clearance CL2 in the direction of the rotation axis X.

The seal ring S1 is not abutted on the input shaft 10.

When the torque converter 2 is further moved from the state of FIG. 3(b) in the direction of the rotation axis X, the engagement start point b2 of the bush 125 of the support member 12 is engaged with the engagement start point a2 of the small diameter portion 101 of the input shaft 10 (cf. FIG. 4).

In this case, the movement of the torque converter 2 in the direction of the rotation axis X from the engagement between the engagement start point a1 and the engagement start point b1 to the engagement between the engagement start point a2 and the engagement start point b2 is guided by the spline 61s and 104s which are fit in and over each other.

Accordingly, the torque converter 2 is not assembled in a state where the torque converter 2 is largely inclined with respect to the rotation axis X.

Moreover, in the input shaft 10, the small diameter portion 10 side is set to satisfy the following conditions (D) to (H).

(D) The length L3 from the engagement start point a2 of the input shaft 10 to the engagement start point a3 at the boundary between the large diameter portion 102 and the diameter increasing portion 103 is longer than the length L4 from the engagement start point b2 of the bush 125 to the engagement start point b3 of the circular plate portion 451 of the spring retainer 45 in the torque converter 2 (L4<L3).

The engagement start point b3 of the spring retainer 45 side confronts the engagement start point a3 of the input shaft 10 side with a clearance CL3 in the direction of the rotation axis X when the engagement start point a2 and the engagement start point b2 are engaged with each other.

(E) A length L5 from the engagement start point a2 of the input shaft 10 to the engagement start point a4 of the stator shaft 11 is longer than a length L6 from the engagement start point b2 of the bush 125 to the engagement start point b4 of the inner race 271 in the torque converter 2 (L6<L5).

The engagement start point a4 of the stator shaft 11 confronts the engagement start point b4 of the inner race 271 with a clearance CL4 in the direction of the rotation axis X when the engagement start point a2 and the engagement start point b2 are engaged with each other.

(F) A length L7 from the engagement start point a2 of the input shaft 10 to the engagement start point a5 of the rotation transmitting member 91 is longer than a length L8 from the engagement start point b2 of the bush 125 to the engagement start point b5 of the sleeve 5 in the torque converter 2 (L8<L7).

The engagement start point a5 of the rotation transmitting member 91 confronts the engagement start point b5 of the sleeve 5 with a clearance CL5 in the direction of the rotation axis X when the engagement start point a2 and the engagement start point b2 are engaged with each other.

(G) A length L9 from the engagement start point a2 of the input shaft 10 to the engagement start point a6 of the stator shaft 11 is longer than a length L10 from the engagement start point b2 of the bush 125 to the engagement start point b6 of the annular wall portion 63 in the torque converter 2 (L10<L9).

The engagement start point a6 of the stator shaft 11 confronts the engagement start point b6 of the inner race 271 with a clearance CL6 in the direction of the rotation axis X when the engagement start point a2 and the engagement start point b2 are engaged with each other.

(H) The relationship of the clearances (CL3, CL4, CL5, and CL6) when the engagement start point a2 and the engagement start point b2 are engaged with each other is CL3<CL4<CL5<CL6.

Accordingly, when the torque converter 2 is further assembled from the state of FIG. 4 to the input shaft 10 of the shift mechanism section, the engagement start points are engaged in the order of the engagement start points a3 and b3, the engagement start points a4 and b4, the engagement start points a5 and b5, and the engagement start points a6 and b6.

FIG. 5(a) is a view showing a state when the engagement start point b3 of the spring retainer 45 side and the engagement start point a3 of the input shaft 10 side are engaged with each other.

FIG. 5(b) is a view showing a state when the engagement start point a5 of the rotation transmitting member 91 and the engagement start point b5 of the sleeve 5 are engaged with each other.

FIG. 6(a) is a view showing a state when the engagement start point a6 of the stator shaft 11 and the engagement start point b6 of the annular wall portion 63 of the turbine hub 60 are engaged with each other.

FIG. 6(b) is a view showing a state when the assembling operation of the torque converter 2 to the input shaft 10 of the shift mechanism section is finished.

When the torque converter 2 is further assembled from the state of FIG. 4 to the input shaft 10 of the shift mechanism section, the engagement start point a3 and the engagement start point b3 are engaged with each other prior to the other engagement start points a4, a5, and a6, and the other engagement start points b4, b5, and b6 since the clearance CL3 between the engagement start point a3 and the engagement start point b3 is narrower than the other clearances CL4, CL5, and CL6.

When the engagement start point a3 and the engagement start point b3 are engaged with each other, in the input shaft 10, a first side (the tip end 10a side) and a second side (the spline 104s side) of the engagement start point a3 in the direction of the rotation axis X are supported, respectively, by the bush 125 and the turbine hub 60.

Accordingly, the assembly operation of the torque converter 2 to the input shaft 10 is continued so that the respective center lines are aligned with each other.

Moreover, the diameter increasing portion 103 of the input shaft 10 is inclined so that the outside diameter is increased toward the spline 104s side (the right side in the drawing). Accordingly, the engagement start point b3 of the torque converter 2 side can be smoothly engaged with the engagement start point a3 of the input shaft 10 side.

When the engagement start point a3 and the engagement start point b3 are engaged with each other, the engagement start points a4 to a6, and the engagement start points b4 to b6 satisfy the following relationships.

The engagement start point a4 of the stator shaft 11 confronts the engagement start point b4 of the inner race 271 with a clearance CL4' in the direction of the rotation axis X.

The engagement start point a5 of the rotation transmitting member 91 confronts the engagement start point b5 of the sleeve 5 with a clearance CL5' in the direction of the rotation axis X.

The engagement start point a6 of the stator shaft 11 confronts the engagement start point b6 of the annular wall portion 63 of the turbine hub 60 with a clearance CL6' in the direction of the rotation axis X.

The relationship among the clearances (CL4', CL5', and CL6') when the engagement start point a2 and the engagement start point b2 are engaged with each other is CL4'<CL5'<CL6'.

When the torque converter 2 is further assembled from the state of FIG. 5(a) to the input shaft 10 of the shift mechanism section, the engagement start point a4 and the engagement start point b4 are engaged. Then, the engagement start point a5 and the engagement start point b5 are engaged (cf. FIG. 5(b)).

In this state, the engagement start point a6 of the stator shaft 11 confronts the engagement start point b6 of the inner race 271 with a clearance CL6" in the direction of the rotation axis X.

In a process from the state of FIG. 5(a) to the state of FIG. 5(b), the main lip portion S4a of the lip seal S4 provided to the support hole 150 of the fixed side member 15 is pressed into contact with the outer circumference 511a of the connection portion 511 of the sleeve 5.

With this, the clearance between the inner circumference of the support hole 150 and the outer circumference of the connection portion 511 of the sleeve 5 are sealed by the lip seal S4.

Moreover, the seal ring S1 provided to the inner circumference of the large diameter support portion 122 of the support member 12 is slid on the outer circumference 103a of the diameter increasing portion 103 of the input shaft 10, and reaches the engagement start point a3.

In this case, when the seal ring S1 is slid on the outer circumference 103a of the diameter increasing portion 103, the inner circumference of the circular plate portion 451 having a predetermined width Wa in the direction of the rotation axis X is slid on the outer circumference of the large diameter portion 102 of the input shaft 10.

Accordingly, in a state where the seal ring S1 of the support member 12 side, and the large diameter portion 102 of the input shaft 10 side are coaxially disposed on the common rotation axis X, the seal ring S1 is slid on the outer circumference 103a of the diameter increasing portion 103.

In a case where the seal ring S1 and the input shaft 10 are not disposed to be coaxial with each other, when the seal ring S1 is slid on the outer circumference 103a of the diameter increasing portion 103, the frictional resistances acted between the seal ring S1 and the outer circumference 103a are different from the circumferential directions around the rotation axis X.

In this case, when the seal ring S1 is slid on the outer circumference 103a, the seal ring S1 may be dropped from the recessed groove 123. In a case where the seal ring S1 and the input shaft 10 are coaxially disposed, the frictional resistances acted between the seal ring S1 and the outer circumference 103a are not largely varied in the circumferential direction around the rotation axis X. Accordingly, the seal ring S1 is hard to be dropped from the recessed groove 123. Moreover, in a process in which the seal ring S1 is slid on the outer circumference 103a, it is possible to prevent the cut of the seal ring S1.

Moreover, when the seal ring S1 provided to the inner circumference of the large diameter support portion 122 of the support member 12 reaches the engagement start point a3, the tip end 10a of the input shaft 10 is positioned radially inside the bush 125.

This is because the length L3 from the engagement start point a2 to the engagement start point a3 (the substantial axial length of the small diameter portion 101 in the direction of the rotation axis X) is set to be shorter than the length Lx2 from the insertion outlet 125b of the bush 125 to the seal ring S1.

When the torque converter 2 is further assembled from the state of FIG. 5(b) to the input shaft 10 of the shift mechanism section, the engagement start point a6 and the engagement start point b6 are engaged with each other (cf. FIG. 6(a)).

In this case, the tip end 910 of the rotation transmitting member 91 is engaged with the outer circumference of the connection portion 511 of the sleeve 5. With this, the sleeve 5 side of the torque converter 2 is disposed to be coaxial with the input shaft 10 on the rotation axis X.

With this, the torque converter 2 and the input shaft 10 are disposed to be coaxial with each other at the tip end 10a side and the base end side (the rotation transmitting member 91 side) of the input shaft 10.

Accordingly, when the torque converter 2 is further assembled from the state of FIG. 6(a) to the input shaft 10 of the shift mechanism section, the member of the torque converter 2 side and the member of the shift mechanism section side are maintained to be disposed to be coaxial with each other, and relatively displaced in the direction of the rotation axis X.

With this, in a state where the annular wall portion 63 of the turbine hub 60, and the tip end portion 111 of the stator shaft 11 are disposed in parallel with each other, the annular wall portion 63 of the turbine hub 60, and the tip end portion 111 of the stator shaft 11 are relatively displaced in the direction of the rotation axis X. Accordingly, it is possible to prevent the engagement start point b6 of the moving annular wall portion 63 from being caught in the seal ring S3 protruding from the outer circumference surface of the tip end portion 111, and thereby to preferably prevent the seal ring 3 from dropping off from the recessed groove 111b.

The automatic transmission 1 (the transmission) according to the embodiment includes the following configurations.

(1) The automatic transmission 1 includes:
  a torque converter 2 including a support member 12 (hollow shaft);
  an input shaft 10 (transmission input shaft) provided radially inside the support member 12;
  a seal ring S1 (seal member) sandwiched between the support member 12 and the input shaft 10; and
  a bush 125 sandwiched between the support member 12 and the input shaft 10, and provided at a tip end 10a side of the input shaft 10 with respect to the seal ring S1,
  the input shaft 10 including a large diameter portion 102 abutted on the seal ring S1, and a small diameter portion 101 which is positioned on the tip end 10a side of the large diameter portion 102, and which has a diameter smaller than a diameter of the large diameter portion 102,
  the seal ring S1 having an inside diameter r3 larger than an outside diameter of the bush 125, and
  the small diameter portion 101 having an axial length (length L3) set to be longer than a length Lx1 from an engagement start point b2 (an insertion inlet of the transmission input shaft) of the bush 125 to the seal ring S1.

At the assembly operation of the torque converter 2 to the input shaft 10, the axis aligning to align the center of the torque converter 2 and the center of the input shaft 10 are performed.

By the above-configuration, the diameter of the bush 125, the diameter of the seal ring S1, and the length of the small diameter portion 101 are set so that the seal ring S1 and the large diameter portion 102 are abutted on each other after the axis aligning. Accordingly, the seal ring S1 and the large diameter portion 102 are abutted on each other after the axis aligning. With this, it is possible to decrease the possibility of the damage of the seal ring S1.

In this case, the abutment between the large diameter portion 102 and the seal ring S1 is performed at a timing at which the clearance CL is disappeared (cf. FIG. 4(b)).

However, the abutment between the large diameter portion 102 and the seal ring S1 is not limited to this. It is preferable that the large diameter portion 102 and the seal ring S1 are abutted on each other after the axis aligning. For example, the large diameter portion 102 and the seal ring S1 may be abutted on each other at a timing at which the clearance CL4 is disappeared.

The automatic transmission 1 according to the embodiment includes the following configurations.

(2) The length L3 (the axial length) of the small diameter portion 101 in the direction of the rotation axis X is set to be shorter than a length Lx2 from an insertion outlet 125b of the bush 125 to the seal ring S1.

For decreasing the size of the automatic transmission 1, it is preferable to suppress the increase of the length of the input shaft 10 in the direction of the rotation axis X (the increase of the axial length).

Accordingly, the length L3 of the small diameter portion 101 is set to be shorter than the length Lx2 from the insertion outlet 125b of the bush 125 to the seal ring S1. The length L3 is set so that the seal ring S1 and the large diameter portion 102 are abutted on each other when the tip end 10a of the small diameter portion 101 passes through the bush 125. With this, it is possible to suppress the increase of the axial length.

For example, it is more preferable that the axial length (the length L3) of the small diameter portion 101 is set to be a length by which the seal ring S1 and the large diameter portion 102 are abutted on each other when the tip end 10a of the small diameter portion 101 is positioned on the insertion outlet 125b side (the back (bottom) side of the center line C of the insertion inlet 125a and the insertion outlet 125b).

The automatic transmission 1 according to the embodiment includes the following configurations.

(3) The small diameter portion 101 includes an oil hole 101a positioned between the bush 125 and the seal ring S1, and configured to supply a hydraulic fluid to a lockup mechanism 4 (lockup clutch) of the torque converter 2.

By this configuration, the seal characteristic is ensured by the bush 125 and the seal ring S1.

The present invention can be also specified as the manufacturing method of the automatic transmission 1.

That is, (4) The automatic transmission 1 manufactured by the manufacturing method of the automatic transmission 1 includes a torque converter including the support member 12 of the input shaft 10, the seal ring S1, and the bush 125.

The input shaft 10 is disposed radially inside the support member 12. The input shaft 10 includes the small diameter portion 101, and the large diameter portion 102 having the outside diameter greater than the outside diameter R1 of the small diameter portion 101.

The seal ring S1 is sandwiched between the support member 12 and the input shaft 10.

The bush 125 is sandwiched between the support member 12 and the input shaft 10. The bush 125 is disposed on the tip end 10a side of the input shaft 10 with respect to the seal ring S1. The bush 125 has the outside diameter r1 smaller than the inside diameter r3 of the seal ring S1.

In the manufacturing method of the automatic transmission 1, when the torque converter 2 is assembled to the input shaft 10, the torque converter 2 is pushed (inserted) in the assembling direction so as to align the axis of the small diameter portion 101 in a state where the seal ring S1 and the large diameter portion 102 are not abutted on each other.

After the axis aligning, the torque converter 2 is further pushed in the assembling direction so that the large diameter portion 102 and the seal ring S1 are abutted.

By the above-configuration, the diameter of the bush 125, the diameter of the seal ring S1, and the length of the small diameter portion 101 are set so that the seal ring S1 and the large diameter portion 102 are abutted on each other after the axis aligning. Accordingly, the seal ring S1 and the large diameter portion 102 are abutted on each other after the axis aligning. With this, it is possible to decrease the possibility of the damage of the seal ring S1.

(5) The length from the engagement start point a2 (first end portion) of the small diameter portion 101 to the engagement start point a1 of the spline portion 104 of the large diameter portion 102 in the direction of the rotation axis X is smaller than a length from the engagement start point b2 of the bush 125 to the engagement start point b3 of the spline 61 of the turbine hub 60.

By this configuration, the large diameter portion 102 and the turbine hub 60 are fit and splined to each other, before the abutment between the small diameter portion 101 and the bush 125. In this case, by the spline-engagement between the large diameter portion 102 and the turbine hub 620, the insertion of the input shaft 10 to the torque converter 2 is guided in the direction of the rotation axis X. With this, the axis aligning is readily performed.

The present invention is not limited to the above-described embodiment. Various variations and improvements are permitted as long as they are included in the gist of the present invention.

The invention claimed is:

1. A transmission comprising:
   a torque converter including a hollow shaft;
   a transmission input shaft provided radially inside the hollow shaft;
   a seal member sandwiched between the hollow shaft and the transmission input shaft; and
   a bush sandwiched between the hollow shaft and the transmission input shaft, and provided at a tip end side of the transmission input shaft with respect to the seal member,
   the transmission input shaft including a large diameter portion abutted on the seal member, and a small diameter portion which is positioned on the tip end side of the large diameter portion, and which has a diameter smaller than a diameter of the large diameter portion,
   the seal member having an inside diameter larger than an outside diameter of the bush, and
   the small diameter portion having an axial length set to be longer than a length from an insertion inlet of the transmission input shaft of the bush to the seal member.

2. The transmission as claimed in claim 1, wherein the axial length of the small diameter portion is set to be shorter than a length from an insertion outlet of the transmission input shaft of the bush to the seal member.

3. The transmission as claimed in claim 1, wherein the small diameter portion includes an oil hole positioned between the bush and the seal member, and configured to supply a hydraulic fluid to a lockup clutch of the torque converter.

4. The transmission as claimed in claim 1, wherein an axial length from a first end of the small diameter portion to a second end of a spline formed in the large diameter portion is set to be shorter than a length from one end of the bush to one end of a spline formed in an inner circumference of a turbine hub in the torque converter.

5. A manufacturing method for a transmission including a torque converter including a hollow shaft;
- a transmission input shaft which is provided radially inside the hollow shaft, and which includes a small diameter portion, and a large diameter portion having a diameter greater than a diameter of the small diameter portion;
- a seal member sandwiched between the hollow shaft and the transmission input shaft; and
- a bush which is sandwiched between the hollow shaft and the transmission input shaft, which is provided at a tip end side of the transmission input shaft with respect to the seal member, and which has an outside diameter smaller than an inside diameter of the seal member, the manufacturing method comprising:

when the torque converter is mounted to the transmission input shaft, pushing the torque converter to align an axis of the small diameter portion in a state where the seal member and the large diameter portion are not abutted, and further pushing the torque converter to contact the large diameter portion and the seal member.

\* \* \* \* \*